United States Patent [19]

Curtis, Jr. et al.

[11] 3,761,579

[45] Sept. 25, 1973

[54] HYDROGEN IODIDE

[75] Inventors: Burnell P. Curtis, Jr.; Loyd W. Fannin, both of Dickinson, Tex.; Frank E. Paulik, Creve Coeur, Mo.; Jerry L. Price, Texas City, Tex.

[73] Assignee: Monsanto Company, St. Louis, Mo.

[22] Filed: Sept. 1, 1971

[21] Appl. No.: 177,098

[52] U.S. Cl. .............................. 423/486, 423/481
[51] Int. Cl. ........ C01b 7/18, C01b 7/12, C01b 7/08
[58] Field of Search ............................ 23/152, 154; 423/486, 481

[56] References Cited
OTHER PUBLICATIONS

J. W. Mellor's "A Comp. Treatise on Inorganic and Theoretical Chemistry", Vol. 2, 1922 Ed., page 66, Longmans, Green & Co., N.Y.

Jacs, Vol. 72, Jan. 1950, pages 42–44.

Joseph A. Babor's "Basic College Chem.", Second Ed., 1953, pages 255–260, Thomas Y. Crowell Co., N.Y.

Perry's Chem. Eng. Handbook, 4th Ed., 1963, inside cover, McGraw-Hill Book Co., N.Y.

*Primary Examiner*—Edward Stern
*Attorney*—Elizabeth F. Sporar et al.

[57] ABSTRACT

Aqueous hydrogen iodide is prepared by the reaction of iodine, water and carbon monoxide in a reaction medium containing a strong acid at temperatures in the range from about 75° to about 200° C and pressures from about 25 to about 500 psig employing a rhodium- or iridium-containing catalyst.

10 Claims, No Drawings

HYDROGEN IODIDE

BACKGROUND OF THE INVENTION

The present invention relates to an improved process for the production of hydrogen iodide and/or alkyl iodides.

A demand for hydrogen iodide (HI) has been created by a process which has recently been developed for the preparation of carboxylic acids and esters by the reaction of an alcohol or an ester, or ether and halide derivatives thereof, with carbon monoxide in contact with catalyst systems formed on mixing of a rhodium component and an iodine component in the presence of carbon monoxide (CO). HI or methyl iodide ($CH_3I$) is usually employed as the iodine component in the manufacture of the catalyst used in this process. Although a well known inorganic acid recognized as having considerable utility as a catalyst, starting or intermediate material in many commercial processes, HI has not achieved any great measure of commercial utilization. It is, therefore, not available in any appreciable quantities and economically expensive methods are employed for its production. Aqueous HI is usually prepared commercially by reducing an aqueous iodine slurry with hydrogen sulfide. Even reagent-grade material normally is contaminated with residual hydrogen sulfide which can easily become an impurity in the end product of any process in which the HI is employed. Anhydrous HI can be produced by the direct reaction of iodine vapor with hydrogen over a platinum catalyst at elevated temperatures. This method provides HI of high purity but the reaction is slow, conversion is not complete and yields of the desired product are consequently low. It is also known (JACS, 72, 42-44, 1950) that rhodium and palladous chlorides will catalyze the reaction between carbon monoxide and iodine to produce HI. However, at the conditions disclosed very low reaction rates were obtained with palladous chloride.

Alkyl iodides can also be employed in the preparation of the catalyst for the carboxylic acid manufacturing process mentioned above and methyl iodide has, in fact, come to be preferred over HI because it is less corrosive and easier to store. However, like HI, it is expensive and not readily available in quantity. Accordingly, it is an object of the invention to provide an improved method for the production of HI of high purity which is both efficient and economical. It is another object of the invention to provide a method whereby either of the iodine-containing compounds, i.e., hydrogen iodide or alkyl iodides, can be prepared at will. It is a still further object of the invention to provide a process whereby either HI or an alkyl iodide can be produced in a common apparatus which is uniquely adaptable for use in conjunction with the process for the preparation of carboxylic acids wherein the catalyst employed involves the use of one or the other of these iodine-containing compounds in its preparation.

Other objects and advantages will become evident from the following description and appended claims.

SUMMARY OF THE INVENTION

According to the present invention, aqueous hydrogen iodide is prepared by reacting iodine with water and carbon monoxide in a reaction medium containing a strong acid at temperatures in the range from about 75° to about 200° C and pressures in the range from 25-500 psig in contact with a metallic catalyst comprising either rhodium or iridium as the metal component. If an alkyl iodide is desired as the product, the aqueous solution of HI is not recovered, but an alkyl alcohol is reacted therewith at a temperature from about 50° to about 125° C in proportions to maintain a molar excess of the HI, and the volatile alkyl iodide is evaporated and condensed. A singular advantage of the process lies in the fact that the catalyst is a self-regenerating one.

DESCRIPTION OF THE PREFERRED EMBODIMENTS

In a typical liquid-phase batch operation, the reaction of iodine, water and CO to produce HI is effected in a reaction medium consisting of an aqueous HI solution. The rhodium or iridium component is added to the reaction medium contained in a suitable reactor and solid iodine is thereafter charged to the resulting mixture. After addition of the iodine, CO is charged to bring the reactor up to the desired pressure while efficient agitation is provided and the reactor is heated to the reaction temperature. An adequate flow of CO is provided to maintain the desired CO partial pressure and sweep out the $CO_2$ formed during the reaction. The gases leaving the reactor are sent through a condenser where water and HI are removed and drained back into the reactor with the residual gases going to a flare for burning. When the iodine is consumed, the water-gas shift reaction occurs. The hydrogen evolved, which has not previously been present in any quantity in the off-gas, is a good indication of the end of the reaction and can be readily detected by means of a gas chromatograph or other suitable hydrogen detector. When the reaction is complete, the HI is removed from the catalyst and excess water by boiling the solution at atmospheric pressure. The initial material, or forecut, is largely water. This is followed by a mixture of HI and water which becomes more concentrated in HI as the evaporation proceeds until the azeotrope (57 weight per cent HI) is produced. Collection of the product may be effected at any concentration of HI up to and including the azeotropic concentration. When the desired amount of product has been collected, the evaporation is discontinued and the forecut added back to the reactor. An appropriate amount of water is also added to the reactor and the cycle is ready to begin again with the addition of more iodine.

If it is desired to produce an alkyl iodide at the completion of the HI reaction, the reactor is depressured to approximately atmospheric and the temperature adjusted in the range from about 50° C to about 125° C depending upon the particular alkyl iodide desired. An alkyl alcohol is then added. The volatile alkyl iodide formed is flashed off as it is formed, condensed and stored. The acid-water-catalyst-containing mixture remaining in the reactor is available for re-use in producing more HI or alkyl iodide whichever is desired.

The reaction of iodine, water and CO is conducted in an acidic reaction medium, i. e., in a medium containing a strong acid in solution. Any strong acid such as HI, HBr, HCl, $H_2SO_4$, $HNO_3$, etc., can be employed. However, HI is preferred since it does not result in formation of by-products which must later be removed from the product. The HI also serves as a solubilizer for the iodine. Water concentration in the action medium is an important consideration. The lower limit of concentration for water in this solution is that of the $HI/H_2O$ azeotrope which is 57% HI and 43% $H_2O$. No reaction occurs if the water is at or below this level. As the reaction proceeds with the formation of HI and the consumption of water, the composition of the reaction solution changes moving in the direction of the azeotropic composition. Accordingly, care must be taken to provide sufficient water initially to maintain water concentration throughout the reaction period at a level to prevent formation of the azeotrope if the iodine charged is to be completely reacted. Increasing the water content tends to increase the reaction rate, but practical limits must be considered. The upper limit of water concentration is determined by the size of the HI manufacturing equipment and the quantity of HI to be produced. Generally, the $HI/H_2O$ weight ratio employed is in the range from 0.05 to 0.8 and preferably is from about 0.3 to about 0.6.

The amount of iodine employed does not greatly affect the reaction rate. The amount charged to the reaction is related to the amount of HI in the reaction solution. Since the reaction will not proceed once the azeotropic solution of HI and water is reached, as indicated above, iodine addition must be regulated so that this concentration is avoided at any point in the reaction. Generally, the weight ratio of iodine to HI is regulated so that it does not exceed 0.70. At ratios in excess of this, the volatility of the iodine will be too high during the initial reaction causing iodine to escape from the reaction solution and remain unreacted by solififying in the condenser.

As previously indicated, the catalyst for the process of the invention is one containing rhodium or iridium which is formed upon mixing of a rhodium or iridium component and an iodine component in the presence of CO. This can occur "in situ" in the reactor as in the usual manner of operation described above, or the catalyst can be prepared externally of the reactor if desired and charged as such to it. The rhodium or irridum component may be either rhodium or iridium metal itself, or compounds of these metals such as their salts, oxides, complexes or coordination compounds. The terms "complex" and "coordination compound" as employed herein means a compound or complex formed by combination of one or more electronically-rich molecules or atoms capable of independent existence with one or more electronically-poor molecules or atoms, each of which may also be capable of independent existence. Among the large number of suitable rhodium or iridium components are, for example, those mentioned in the following list which, however, is by no means considered to be a limiting one with respect to the metallic component of the catalyst.

| | | |
|---|---|---|
| $RhCl_3 \cdot xH_2O$ | $Rh_2O_3 \cdot 5H_2O$ | $IrCl_3$ |
| $RhBr_3$ | $Rh_2(CO)_4Cl_2$ | $IrBr_3 \cdot 4H_2O$ |
| $RhI_3$ | $Rh_2(CO)_4Br_2$ | $IrI_3$ |
| $Rh(NO_3)_3 \cdot 2H_2O$ | $Rh_2(CO)_4I_2$ | $Ir(NO_3)_3$ |
| $Rh_2O_3$ | $Rh_4(CO)_{12}$ | $Ir_2O_3$ |
| | | $Ir_4(CO)_{12}$ |

The iodine-containing component of the catalyst is preferably HI, but it may be iodine itself or any iodine-containing compound such as alkyl iodides, e.g., methyl iodide, ethyl iodide, and the like, aryl iodides such as phenyl iodide, or iodine salts, e.g., sodium or potassium iodide, ammonium iodide and the like.

The amount of catalyst employed may be varied considerably. Increasing catalyst concentration increases the rate of reaction. The maximum amount to be used is limited only by the solubility of the rhodium or iridium in the reaction solution. However, maximum levels are reached based on economic considerations before those based on solubility. In general, the amount of catalyst to be employed is that required to provide a concentration of soluble rhodium or iridium in the reaction solution of from about 10 ppm to about 3000 ppm by weight. Depending upon equipment size, desired reaction time cycles and other factors, optimum reaction rates are obtained by employing a catalyst preferably containing from 200 to 1500 ppm of the soluble rhodium or iridium.

An important variable in the process is the CO partial pressure which is more important than the total pressure. The CO partial pressure is determined by the temperature, total pressure, the rate of $CO_2$ formation and the CO feed rate. At low CO feed rates, the $CO_2$ concentration in the off-gas will be high, the CO partial pressure will be low and the reaction time will be relatively long. At high CO feed rates the $CO_2$ concentration in the off-gas will be low, the CO partial pressure will be high and the reaction time will be relatively short. The reaction time is approximately inversely proportional to CO partial pressure. CO partial pressures should generally be maintained in the range from 5–300 psia for practical reaction times and preferably from 25–75 psia for optimum CO utilization.

The CO must be intimately contacted with the liquid reaction solution to effect the reaction. This can be accomplished by introducing CO into the bottom of the reactor by means of a sparger valve or through dip tubes so that it is purged through the liquid. There must also be complete mixing in the reactor to insure reaction. An efficient agitator is required since the reaction rate increases with increased mixing.

Reaction rate increases with reaction temperature. Temperatures from 75° C to about 200° C may be employed. There is no real upper limit on temperature as far as the reaction is concerned. However, at temperatures above 150° C, severe corrosion problems are more likely to arise from higher concentrations of iodine in the vapor. Preferred temperatures are those in the range from about 100° to 175°C.

The step of converting the HI formed into alkyl iodide such as methyl iodide is relatively simple and straightforward. At the completion of the reaction producing HI, the reactor is simply depressurized to atmospheric pressure and cooled to a temperature from about 50° C to about 125° C depending upon the particular iodide being prepared. An alkyl alcohol such as methanol ($CH_3OH$), for example, is then added to the mixture of HI, water and catalyst in an amount to provide a $CH_3OH/Hi$ mol ratio not to exceed 0.5. There is no lower limit on the amount of $CH_3OH$ to be added. This depends strictly on how much methyl iodide is to be made. However, if more than the amount of $CH_3OH$ specified is added, it will not all react and the unreacted alcohol will be left in the reactor dissolved in the two liquid phases leading to the formation of an impure product when the methyl iodide is flashed off. The temperature during this reaction is maintained in the range from about 75° to about 110° C. In view of its high vapor pressure under these conditions, the methyl iodide formed will pressure up the reactor while it is blocked in and will flash when the pressure is released. High purity methyl iodide can then be collected by flashing through a condenser. The condensate containing a small amount of water which forms as a separate layer can be separated to recover the methyl iodide product.

Preferred conditions for this step include a temperature of 80°–90° C and a $CH_3OH/HI$ mol ratio of 0.33 to 0.5. Under these conditions the reaction takes place essentially instantaneously. In a similar manner, other alkyl iodides containing from one to three carbon atoms in the alkyl group can be produced by reacting the corresponding alkyl alcohols with the HI reaction mixture employing an alcohol/HI mol ratio of less than 0.5 and maintaining the temperature in the range from 50° to 125° C. Examples include ethyl iodide from ethyl alcohol, n-propyl iodide from n-propyl alcohol, and isopropyl iodide from isopropyl alcohol.

The invention is illustrated in the following examples which, however, are not to be construed as limiting it in any manner.

EXAMPLE 1

A series of runs was made in which iodine was reacted with water and CO in the presence of a rhodium catalyst.

A 3-ounce Fischer-Porter aerosol-compatibility test bottle fitted with inlet and exit lines and the necessary regulating valves was employed as a reactor. A stainless steel jacket was used around the bottle for runs above 50 psig and the jacket was pressured to within about 10 psig of the reactor pressure. The reactor was heated by means of a constant-temperature oil bath controlled to ±0.5° C. A glass sparging frit connected to the CO inlet line with a Teflon sleeve served to disperse the gas below the liquid level and additional agitation was provided by a magnetic stirring bar.

Another 3-ounce Fischer-Porter pressure bottle filled with a solution of potassium iodide and hypophosphorous acid was used to trap iodine vapors in order to prevent corrosion in the system.

The reactor was filled with 25 ml of solution containing HI, water, iodine and the rhodium-containing catalyst component. It was heated in the oil bath to reaction temperature and pressured under nitrogen flow, then CO was fed instead of nitrogen at a rate of about 50 ml per minute to provide the desired partial pressure. Off-gas analyses were made with a gas chromatograph at 10–15 minute intervals. The reaction was normally continued for 30 minutes after the appearance of hydrogen in the off-gas which indicated completion of the reaction. Reaction conditions are presented in Table I. The yield based on iodine was essentially 100 percent over the reaction time given in all runs except Run No. 4 which failed to go to completion because the HI-$H_2O$ azeotrope composition was reached before the iodine was all reacted.

When hydrated rhodium oxide ($Rh_2O_3 \cdot 5H_2O$) was employed, the catalyst was precarbonylated, i.e., the HI, water and rhodium compound were heated at 130° C with CO being fed to the reactor for at least two hours before the iodine was added to the reactor.

EXAMPLE 2

Approximately 49 lb of iodine was introduced into a solution of 196 lb of water and 125 lb of HI containing 400–500 ppm of hydrated rhodium oxide catalyst in a standard Pfaudler 50-gallon glass-lined kettle equipped with a variable speed agitator and necessary accessory lines. The reactor was then blocked off and pressured up to 50 psig with carbon monoxide. With the agitator on, the reactor was heated by means of steam on the reactor jacket to a temperature of 135° C which was maintained throughout the reaction by regulating the steam pressure. Carbon monoxide was then introduced into the bottom of the reactor while the effluent gases were withdrawn overhead, passed through a heat exchanger, a liquid trap and regulating valves to a gas chromatograph for analysis of CO, $CO_2$ and $H_2$ before being sent to a flare. Pressure in the reactor was maintained at about 80 psig. When the chromatograph showed the reaction to be complete by indicating the presence of hydrogen in the effluent gas after about 4 hrs., the flow of CO was stopped and the reactor was allowed to depressure to the flare.

TABLE I

| Run No. | HI (g.) | $H_2O$ (g.) | $I_2$ (g.) | $I_2$/HI (wt.) | Rh species | Rh conc. (p.p.m.) | Temp. (°C.) | Reac. press. (p.s.i.g.) | CO partial pressure (p.s.i.a.) | Reac. time (min.) |
|---|---|---|---|---|---|---|---|---|---|---|
| 1 | 11.2 | 20.9 | 3.75 | 0.335 | [Rh(CO)$_2$Cl]$_2$ | 1,500 | 90 | 50 | >25 | 250 |
| 2 | 11.2 | 20.9 | 3.75 | 0.335 | Same as above | 1,500 | 130 | 50 | >25 | 95 |
| 3 | 5.6 | 22.6 | 3.75 | 0.669 | do | 1,500 | 130 | 50 | >25 | 95 |
| 4 | 17.9 | 18.3 | 5.95 | 0.332 | do | 1,500 | 130 | 50 | >25 | Incomplete |
| 5 | 10.5 | 19.6 | 7.0 | 0.667 | do | 1,500 | 130 | 50 | 31.0 | 280 |
| 6 | 10.5 | 19.6 | 7.0 | 0.667 | do | 1,500 | 130 | 80 | 47.4 | 135 |
| 7 | 10.5 | 19.6 | 7.0 | 0.667 | do | 500 | 130 | 80 | >25 | 285 |
| 8 | 10.7 | 20.1 | 3.6 | 0.336 | do | 500 | 130 | 50 | >25 | 230 |
| 9* | 10.3 | 19.5 | 7.0 | 0.679 | do | 1,500 | 130 | 80 | 42.6 | 155 |
| 10** | 10.5 | 19.6 | 7.0 | 0.667 | do | 1,500 | 130 | 80 | 33.4 | 215 |
| 11† | 10.5 | 19.6 | 7.10 | 0.676 | do | 1,500 | 130 | 80 | 53.8 | 140 |
| 12 | 10.5 | 19.6 | 7.00 | 0.667 | $Rh_2O_3 \cdot 5H_2O$ | 1,500 | 130 | 80 | 50.0 | 115 |
| 13 | 10.5 | 19.6 | 7.00 | 0.667 | Same as above | 1,500 | 90 | 80 | 80.3 | 355 |
| 14 | 7.06 | 21.4 | 4.5 | 0.637 | do | 1,500 | 110 | 80 | 59.1 | 125 |
| 15 | 10.5 | 19.6 | 7.0 | 0.667 | do | 1,500 | 110 | 80 | 67.6 | 230 |
| 16 | 7.06 | 21.4 | 4.5 | 0.637 | do | 1,500 | 130 | 80 | 31.6 | 39 |
| 17 | 10.5 | 19.6 | 7.0 | 0.667 | do | 500 | 130 | 80 | 56.0 | 215 |

*CO flow rate 25 ml./min.
**CO flow rate 12.5 ml./min.
†Precarbonylated as described for $Rh_2O_3 \cdot 5H_2O$.

Steam on the reactor was shut off and it was allowed to cool to about 100° C. The reactor was blocked in completely and 13.3 lb of methanol ($CH_3OH/HI = 0.3$) was injected into it with the temperature being maintained in the range from about 104°–110° C. The methyl iodide produced was withdrawn through a condenser into a sub-cooler from which it was drained off as a separate layer from the small amount of water condensed with it into a collection vessel. Approximately 51 lb of methyl iodide representing a yield based on methanol of 87 percent was obtained.

EXAMPLE 3

Following the procedure of Example 1 and using the apparatus described therein, a solution containing 10.5 g of HI, 19.6 g of water and 1500 ppm of iridium chloride ($IrCl_3$) is charged to the reactor. After adding 7.0 g of iodine, the mixture is reacted with carbon monoxide at a temperature of 175° C and a pressure of 120 psig. In a time comparable with that obtained in Runs No. 6 and 12 of Table I, the iodine is completely reacted to HI which is recovered as an aqueous solution by evaporating the reaction mixture upon completion of the reaction directly from the reactor and condensing the vapors which are given off.

EXAMPLE 4

Following essentially the same procedure described in Example 2 but using commercial scale equipment, 1800 lb of iodine was charged to a solution of 5608 lb of water and 3120 lb of HI containing about 376 ppm of rhodium iodide catalyst in a glass-lined reaction vessel equipped with an efficient agitator and necessary accessory lines. Carbon monoxide was fed to the reactor, maintained at a pressure of 80 psig and a temperature of about 133° C, until all the iodine charged had been reacted, i.e., over a period of about 4 hours.

Upon completion of the reaction, the reactor was depressured to the flare and cooled to about 90° C. After it had been blocked in, approximately 450 lb of methanol ($CH_3OH$/HI mole ratio 0.37) was introduced into the reactor while the temperature was maintained from about 80° to about 90° C. The methyl iodide produced was condensed and separated from the water condensed with it be decantation. Conversion of methanol to methyl iodide was quantitative.

Although the foregoing description is largely directed to a liquid-phase batch process, it is obvious that the process can be operated on a continuous basis. Also, it is readily apparent that the process can be conducted with all reactants in the vapor phase using the rhodium or iridium catalysts deposited on inert support materials such as alundum, activated carbon, clays, alumina, silica-alumina, etc., in a fixed-bed reactor maintained at the temperatures and pressures described above. Use of a liquid reaction medium, however, is preferred.

Those skilled in the art, too, will readily understand that both hydrogen bromide or hydrobromic acid and hydrogen chloride or hydrochloric acid can be produced by reacting bromine with water and carbon monoxide of chlorine with water and carbon monoxide, respectively, according to the process of the invention.

What is claimed is:

1. reacting iodine process for the production of hydrogen iodide which comprises reactingiodine with water and carbon monoxide in an aqueous solution of hydrogen iodide as a reaction medium, the weight ratio of hydrogen iodide to water employed being from about 0.05 to about 0.8, at a temperature from about 75° to about 200° C, a reaction pressure from about 25 to about 500 psig, a partial pressure of carbon monoxide from about 5 to about 300 psia in contact with a metallic catalyst which is formed on mixing of (1) a metal component selected from the group consisting of rhodium and irridium metals and the salts, oxides, complexes and coordination compounds of rhodium and iridium and (2) an iodine component selected from the group consisting of iodine, hydrogen iodide, alkyl iodides, aryl iodides and iodine salts in the presence of carbon monoxide.

2. The process of claim 1 wherein the amount of catalyst present is that required to provide a concentration of the soluble metal component in the range from about 10 to about 3000 parts by weight per million parts by weight of the reaction medium.

3. The process of claim 2 wherein the weight ratio of iodine to hydrogen iodide is below about 0.7.

4. The process of claim 3 wherein the metal component of said catalyst is $[Rh(CO)_2Cl]_2$ and the iodine component is aqueous hydrogen iodide.

5. The process of claim 3 wherein the metal component of said catalyst is rhodium oxide and the iodine component is aqueous hydrogen iodide.

6. The process of claim 3 wherein the metal component of said catalyst is rhodium iodide and the iodine component is aqueous hydrogen iodide.

7. The process of claim 3 wherein the metal component of said catalyst is iridium chloride and the iodine component is aqueous hydrogen iodide.

8. The process of claim 4 wherein said temperature is from about 100° to 150° C, said catalyst is present in the amount required to provide a concentration from about 200 to about 1500 parts of soluble rhodium per million parts of the reaction medium, said HI to water ratio is from about 0.3 to about 0.6 and said partial pressure of CO is from about 25 to about 75 psia.

9. The process of claim 5 wherein said temperature is from about 100° to 150° C, said catalyst is present in the amount required to provide a concentration from about 200 to about 1500 parts of soluble rhodium per million parts of the reaction medium, said HI to water ratio is from about 0.3 to about 0.6, and said partial pressure of CO is from about 25 to 75 psia.

10. The process of claim 6 wherein said temperature is from about 100° to 150° C, said catalyst is present in an amount required to provide a concentration from about 200 to about 1500 parts of soluble rhodium per million parts of the reaction medium, said HI to water ratio is from about 0.3 to aabout 0.6., and said partial pressure of CO is from about 25 to about 75 psia.

* * * * *

PO-1050
(5/69)

UNITED STATES PATENT OFFICE
CERTIFICATE OF CORRECTION

Patent No. 3,761,579          Dated September 25, 1973

Inventor(s) Burnell P. Curtis, Jr. et al

It is certified that error appears in the above-identified patent and that said Letters Patent are hereby corrected as shown below:

Column 2, line 65, for "action" read -- reaction --.

Column 3, line 28, for "solififying" read -- solidifying --.

Column 4, line 52, for "$CH_3OH/Hi$" read -- $CH_3OH/HI$ --.

Column 7, line 24, for "be" read -- by --.

Column 7, line 40, for "of" read -- or --.

Column 7, line 43, Claim 1, for "reacting iodine" read -- A --.

Signed and sealed this 29th day of January 1974.

(SEAL)
Attest:

EDWARD M. FLETCHER, JR.
Attesting Officer

RENE D. TEGTMEYER
Acting Commissioner of Patents